(12) United States Patent
Hao et al.

(10) Patent No.: US 11,726,265 B2
(45) Date of Patent: Aug. 15, 2023

(54) OPTICAL WAVEGUIDE WITH SPATIALLY MODULATED INDEX REGION

(71) Applicant: 3M INNOVATIVE PROPERTIES COMPANY, St. Paul, MN (US)

(72) Inventors: Bing Hao, Woodbury, MN (US); Michael A. Haase, St. Paul, MN (US); Terry L. Smith, Roseville, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 213 days.

(21) Appl. No.: 17/250,174

(22) PCT Filed: Jun. 25, 2019

(86) PCT No.: PCT/IB2019/055337
§ 371 (c)(1),
(2) Date: Dec. 8, 2020

(87) PCT Pub. No.: WO2020/003118
PCT Pub. Date: Jan. 2, 2020

(65) Prior Publication Data
US 2021/0255397 A1    Aug. 19, 2021

Related U.S. Application Data

(60) Provisional application No. 62/691,965, filed on Jun. 29, 2018.

(51) Int. Cl.
G02B 6/30 (2006.01)
G02B 6/34 (2006.01)
G02B 6/124 (2006.01)

(52) U.S. Cl.
CPC ............. *G02B 6/305* (2013.01); *G02B 6/124* (2013.01); *G02B 6/34* (2013.01)

(58) Field of Classification Search
CPC . G02B 6/24; G02B 6/305; G02B 6/34; G02B 6/42; G02B 6/124
See application file for complete search history.

(56) References Cited

U.S. PATENT DOCUMENTS 9,274,283 B1    3/2016    Ellis-Monaghan
2006/0215720 A1    9/2006    Corzine et al.
(Continued)

FOREIGN PATENT DOCUMENTS

WO    WO 2013-117555    8/2013

OTHER PUBLICATIONS

Laere, "Compact Focusing Grating Couplers for Silicon-on-Insulator Integrated Circuits", IEEE Photonics Technology Letters, 2007, vol. 19, No. 23, pp. 1919-1921.
(Continued)

*Primary Examiner* — Michael P Mooney
(74) *Attorney, Agent, or Firm* — Jonathan L. Tolstedt

(57) ABSTRACT

An optical waveguide propagates an optical mode at a first wavelength along a length of the waveguide. The optical waveguide has an optical core with a substantially polygonal cross-section in a plane substantially perpendicular to the length of the waveguide. The optical core has an index of refraction n1 at the first wavelength. A first optical cladding is disposed adjacent the optical core and has an index of refraction n2 at the first wavelength, n2<n1. A spatially modulated index region has alternating higher and lower index regions extending along a width, and arranged along the length, of the optical waveguide, and configured to extract an optical mode that would otherwise propagate along the length of the waveguide.

10 Claims, 9 Drawing Sheets

(56) References Cited

U.S. PATENT DOCUMENTS

2016/0363728 A1 12/2016 Wang
2017/0054269 A1* 2/2017 Tamura ............... H01S 5/02255
2018/0011251 A1* 1/2018 Pelc ........................ G02B 1/11

OTHER PUBLICATIONS

Orobtchouk, "High-Efficiency Light Coupling In a Submicrometric Silicon-On-Insulator Waveguide", Applied Optics, vol. 39, No. 31, 2000, pp. 5773-5777.
Roelkens, "Grating-Based Optical Fiber Interfaces for Silicon-on-Insulator Photonic Integrated Circuits", IEEE Journal of Selected Topics in Quantum Electronics, 2011, vol. 17, No. 03, pp. 571-580.
Taillaert, "Grating Couplers for Coupling between Optical Fibers and Nanophotonic Waveguides", Japanese Journal of Applied Physics, 2006, vol. 45, No. 8A, pp. 6071-6077.
International Search Report for PCT International Application No. PCT/IB2019/055337, dated Oct. 21, 2019, 2 pages.

\* cited by examiner

OPTICAL WAVEGUIDE WITH SPATIALLY MODULATED INDEX REGION

TECHNICAL FIELD

This disclosure relates generally to optical devices such as photonic integrated circuits.

BACKGROUND

Optical devices can be used for a variety of applications including telecommunications networks, local area networks, data center links, and internal links in computer devices. Increasingly, optical functions are being incorporated in small integrated devices, such as photonic integrated circuits (PIC). A PIC device may include optical elements such as waveguides, gratings detectors, lasers, etc., that are fabricated using processes such as material deposition, photolithography, and etching. A PIC may be coupled with external optical devices via optical fibers. One challenge in utilizing a PIC in this way is efficient coupling of light into small-core PIC waveguides or other small-scale optical devices on the PIC.

BRIEF SUMMARY

One embodiment is directed to an optical waveguide for propagating an optical mode at a first wavelength along a length of the waveguide. The optical waveguide has an optical core with a substantially polygonal cross-section in a plane substantially perpendicular to the length of the waveguide. The optical core has an index of refraction n1 at the first wavelength. A first optical cladding is disposed adjacent the optical core and has an index of refraction n2 at the first wavelength, n2<n1. A spatially modulated index region comprises alternating higher and lower index regions extending along a width, and arranged along the length, of the optical waveguide, and configured to extract an optical mode that would otherwise propagate along the length of the waveguide. The spatially modulated index region has a length L along the length of the waveguide greater than about 30 microns. A rate of change of n1 with temperature T is $\Delta n1/\Delta T$, and a rate of change of silicon with temperature T is $\Delta n(Si)/\Delta T$, where $\Delta n1/\Delta T < \Delta n(Si)/\Delta T$.

In some configurations, the cross-section may be substantially trapezoidal, rectangular, or square. The optical core may comprise two substantially straight opposing sides. The optical core may comprise silicon nitride and/or the first optical cladding may comprise silicon dioxide. The optical core may comprise silicon dioxide doped with a dopant, and the dopant may increase n1. The dopant may reduce a rate of change of n1 with temperature T. The dopant may be phosphorous or titanium.

In some configurations, the optical core may comprise one or more of silicon oxynitride, titanium oxide, zirconium oxide, hafnium oxide and alloys thereof. The optical core may comprise amorphous silicon. In some configurations, n1−n2 may be greater than about 0.001, 0.01, 0.1, 0.2, 0.3, or 0.6. The first wavelength may be in a range from about 1250 nm to about 1650 nm. The optical waveguide may be capable of supporting multiple optical modes at the first wavelength.

In some configurations, the optical waveguide may be part of an optical system. In the system, the optical waveguide receives light from a source of light, the source of light exciting only the fundamental optical mode of the optical waveguide. The source of light may comprise a second optical waveguide sequentially arranged with the optical waveguide along the length of the optical waveguide.

In some configurations, the optical waveguide is a two-dimensional waveguide so that an optical mode propagating along the length of the waveguide is substantially confined along both the width and a thickness of the optical waveguide.

In some configurations, at least a portion of the spatially modulated index region is formed in the first optical cladding and/or the optical core. The optical waveguide may further comprise a second optical cladding disposed adjacent the optical core opposite the first optical cladding, in which case at least a portion of the spatially modulated index region may be formed in the second optical cladding. The second optical cladding may comprise silicon dioxide.

In some configurations, the optical waveguide may comprise first and second optical waveguide portions sequentially arranged along the length of the waveguide. In such a configuration, the second optical waveguide portion may be capable of supporting multiple optical modes at the first wavelength. The first optical waveguide portion may be single-mode at the first wavelength, and the second optical waveguide portion may be capable of supporting multiple optical modes at the first wavelength. In these configurations, an optical single-mode propagating along the first waveguide portion may excite substantially only a fundamental optical mode of the second waveguide portion, the excited fundamental optical mode propagating along the second waveguide portion. The optical waveguide may further comprise a transition region connecting the first and second optical waveguide portions. The transition region gradually increases in width in a direction from the first optical waveguide portion to the second optical waveguide portion. The width of the transition region may be governed by the equation: $W1 = Wo + 2A \sin^2(\pi x/T)$, wherein Wo is the width of the transition region at the first optical waveguide portion, A is a constant, and T is a length of the transition region along the length of the optical waveguide. The value of A may be in a range from about 3 microns to about 75 microns. The width of the transition regions may increase substantially linearly in the direction from the first optical waveguide portion to the second optical waveguide portion.

In some configurations, the optical waveguide may be single-mode at the first wavelength or may be capable of supporting multiple optical modes at the first wavelength. In some configurations, L>40 microns, L>50 microns, L>75 microns, L>100 microns, or L>125 microns. In any of these configurations, wherein L may be less than 150 microns.

In some configurations, the alternating higher and lower index regions of the spatially modulated index region may form a substantially periodic pattern along the length of the waveguide. The periodic pattern may have a period in a range from about 0.42 microns to about 2.4 microns.

In some configurations, the spatially modulated index region may comprise a corrugated surface comprises alternating grooves and ridges extending across the width and arranged along the length of the optical waveguide. In such a configuration, each groove comprises a corresponding lower index region of the alternating higher and lower index regions of the spatially modulated index region. Each ridge comprises a corresponding higher index region of the alternating higher and lower index regions of the spatially modulated index region.

In some configurations, the alternating higher and lower index regions of the modulated index region may form a phase grating. The spatially modulated index region may extend across substantially the entire width of the optical waveguide. At least one region in the alternating higher and lower index regions may extend across substantially the entire width of the optical waveguide. Most regions in the alternating higher and lower index regions may extend across substantially the entire width of the optical waveguide. Tach region in the alternating higher and lower index regions may extend across substantially the entire width of the optical waveguide.

In some configurations, an optical mode extracted by the spatially modulated index region may exit the waveguide making an angle with a normal to the waveguide in a range from about 0 degrees to about 45 degrees. An optical mode extracted by the spatially modulated index region may exit the waveguide making an angle with a normal to the waveguide in a range from about 0 degrees to about 30 degrees. An optical mode extracted by the spatially modulated index region may exit the waveguide having a beam diameter greater than about 15 microns. An optical mode extracted by the spatially modulated index region may exit the waveguide having a beam diameter greater than about 30 microns. An optical mode extracted by the spatially modulated index region may exit the waveguide having a beam diameter greater than about 50 microns.

In some configurations, the optical waveguide may further comprise an optical substrate, the first optical cladding disposed between the optical core and the optical substrate. The substrate may comprise silicon. In such a configuration, the optical waveguide may further comprise a second optical cladding disposed adjacent the optical core, the optical core disposed between the second optical cladding and the optical substrate. The second optical cladding may comprise silicon dioxide.

In some configurations, the spatially modulated index region may comprise a metal grating comprises alternating metal and dielectric portions extending across the width and arranged along the length of the optical waveguide. In such a configuration, a real part of an index of refraction of each metal portion defines one of a higher and lower index region in the alternating higher and lower index regions of the spatially modulated index region, each dielectric portion defining the other of a higher and lower index region in the alternating higher and lower index regions of the spatially modulated index region. The dielectric portions may comprise air.

In some configurations, each higher and lower index region in the alternating higher and lower index regions may be elongated and straight across the width of the optical waveguide. Each higher and lower index region in the alternating higher and lower index regions may be elongated and curved across the width of the optical waveguide. At least two regions in the alternating higher and lower index regions may have different radii of curvature.

In some configurations, for at least a first region in the alternating higher and lower index regions, at least one of a thickness and index of the first region may be spatially modulated across the width of the optical waveguide. For at least a first region in the alternating higher and lower index regions, the first region may be discontinuous across the width of the optical waveguide. For at least a first region in the alternating higher and lower index regions, a characteristic of the first region may be spatially modulated across the width of the optical waveguide. The characteristic may be one or more of a thickness, a width, and an index of refraction of the first region.

In some configurations, a same characteristic of at least two regions in the alternating higher and lower index regions may be spatially modulated differently across the width of the optical waveguide. One or more characteristics of at least some regions in the alternating higher and lower index regions may be spatially modulated across the width of the optical waveguide, so that an optical mode extracted by the spatially modulated index region exits the waveguide having a substantially gaussian intensity profile. The spatially modulated index region may comprise an elevated region elevated, and defining a step, relative to the optical core. The elevated region may have the index of refraction n2, and at least a portion of the spatially modulated index region may be formed in the elevated region and the optical core.

In some configurations, the optical waveguide may further comprise a mirror, the first optical cladding disposed between the optical core and the mirror. The mirror may be a metallic mirror and/or a distributed Bragg reflecting mirror.

In one configuration, the optical waveguide may be part of an optical system that comprises an optical fiber. Light propagating along the optical fiber at the first wavelength exits the optical fiber having a first intensity profile. The first intensity profile has a first shape. One or more characteristics of at least some regions in the alternating higher and lower index regions of the optical waveguide are spatially modulated across the width of the optical waveguide, so that an optical mode extracted by the spatially modulated index region exits the waveguide having a second intensity profile having substantially the first shape. The optical fiber is positioned to receive the extracted optical mode.

In some configurations, the optical system may further comprise an optical element for redirecting the extracted optical mode toward the optical fiber. The redirected extracted optical mode may have a third intensity profile having the first shape. The optical element may reduce a divergence of the extracted optical mode, and the first shape may be gaussian.

In one embodiment, an optical waveguide propagates an optical mode at a first wavelength along a length of the waveguide. The optical waveguide comprises an optical core having first and second optical core portions sequentially arranged along the length of the waveguide and having different respective first and second indices of refraction n1 and n2 at the first wavelength. The optical mode propagating along the first core portion couples from the first core portion to the second portion at an interface therebetween. A first optical cladding is disposed adjacent the optical core and extends along the first and second optical core portions. The first optical cladding has an index of refraction at the first wavelength less than n1 and n2. A spatially modulated index region is disposed on or in the second optical core portion of the optical core and comprises alternating higher and lower index regions extending along a width, and arranged along the length of the optical waveguide, and is configured to extract the optical mode that would otherwise propagate along the length of the waveguide. A rate of change of n1 with temperature T is $\Delta n1/\Delta T$, a rate of change of n2 with temperature T is $\Delta n2/\Delta T$, $\Delta n2/\Delta T < \Delta n1/\Delta T$.

In some configurations, n1 may be less than n2 and/or a thickness t1 of the first optical core portion may be different than a thickness t2 of the second optical core portion. Or, the first and second optical core portions may have substantially a same thickness. The first and second optical core portions may have substantially a same material composition or substantially different material compositions. The spatially modulated index region may have a length L along the length of the waveguide greater than about 30 microns. The first optical cladding may extend seamlessly along the first and second optical core portions.

In some configurations, the first optical cladding may comprise a seam located proximate the interface between the first and second optical core portions. The first optical cladding may comprise a sequentially arranged first and second cladding portions, the first cladding portion disposed adjacent the first optical core portion and having an index of refraction less than n1, the second cladding portion disposed adjacent the second optical core portion and having an index of refraction less than n2. A thickness t3 of the first optical cladding portion may be different than a thickness t4 of the second optical cladding portion.

In some configurations, the first and second optical cladding portions may have substantially a same thickness. The first and second optical cladding portions have substantially a same material composition or substantially different material compositions. For at least first and second regions in the alternating higher and lower index regions with the first region being disposed between the first optical core portion and the second region, the first region may be more curved than the second region. For at least first and second regions in the alternating higher and lower index regions with the first region being disposed between the first optical core portion and the second region, a same characteristic of the first and second regions may be spatially modulated at a higher frequency in the first region and at a lower frequency in the second region across the width of the optical waveguide.

In some configurations, the optical waveguide may be a single mode waveguide in regions corresponding to each of the first and second optical core portions, so that an optical mode propagating along the length of the waveguide is substantially confined along both the width and a thickness of the optical waveguide while propagating in each of the first and second optical core portions. In some configurations, the optical waveguide may be a single mode waveguide at the first wavelength in regions corresponding to the first optical core portion, and capable of supporting multiple modes in regions corresponding to the second optical core portion, so that an optical single mode propagating along the first optical core portion excites substantially only a fundamental optical mode of the second waveguide portion.

In some configurations, the first optical core portion may be narrower than the second optical core portion and/or the first and second optical core portions have substantially the same thickness. The optical waveguide may further comprise a transition core region connecting the first and second optical core portions. The transition core region may gradually increase in width in a direction from the first optical core portion to the second optical core portion.

In some configurations, the optical waveguide may be single-mode at the first wavelength in regions corresponding to each of the first and second optical core portions. The optical waveguide may be capable of supporting multiple optical modes at the first wavelength in regions corresponding to each of the first and second optical core portions.

The interface between the first and second optical core portions may extend along a direction substantially perpendicular to the length of the waveguide. The interface between the first and second optical core portions may extend along a direction making an angle α with the length of the waveguide, α≥5 degrees.

In one embodiment, an optical waveguide propagates an optical mode at a first wavelength. The optical waveguide comprises an optical core disposed on a substrate and a grating configured to extract an optical mode that would otherwise propagate along the optical core along a first direction. The grating comprises a plurality of grating elements forming a substantially periodic pattern. Each grating element extends along a length of the grating element in a direction substantially perpendicular to the first direction. A same characteristic of at least two grating elements are spatially modulated differently along the respective lengths of the at least two grating elements. A diameter of a largest circle that can be inscribed within the grating is greater than about 30 microns.

In some configurations, the characteristic may be a height, a width, or an index of refraction of the grating element. The substrate may be silicon, and the optical core may have an index of refraction n1 at the first wavelength, a rate of change of n1 with temperature being less than a rate of change of silicon with temperature. At least one of the at least two grating elements may be spatially nonuniformly modulated along the length of the grating element.

In some configurations, the optical waveguide may further comprise a first optical cladding disposed adjacent the optical core between the optical core and the substrate. An index of refraction of the first optical cladding at the first wavelength is less than an index of refraction of the optical core at the first wavelength. The optical waveguide may further comprise a second optical cladding disposed adjacent the optical core, the optical core disposed between the second optical cladding and the substrate. The second optical cladding may comprise silicon dioxide. An optical mode extracted by the grating exits the waveguide may a largest lateral dimension greater than about 50 microns.

BRIEF DESCRIPTION OF DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION OF ILLUSTRATIVE EMBODIMENTS

Embodiments described herein relate to optical devices such as photonic integrated circuits (PICs). A PIC is an optical device that is formed using processes similar to electronic integrated circuits, such as photolithography, layer deposition, etching, etc. Grating couplers can be used in PIC systems for input and output light coupling and for wafer-scale testing. In some applications, light couples into and out of the PIC via single mode optical fibers (e.g., fiber optic cable assemblies), where the mode field diameter is roughly 10 µm. In some devices, expanded beam coupling is used to couple external waveguides to the PIC, where the beam diameter is much larger than 10 µm to relax onboard alignment requirements. In this disclosure, a coupler is described usable with expanded beam coupling is disclosed.

In some embodiments, a PIC is formed using silicon-based materials, sometimes referred to as Silicon Photonics. Silicon photonics relies on the fact that silicon is transparent in the wavelength region (1300-1600 nm) typically used for communication over single-mode fiber. Low loss waveguides can be fabricated by etching ridges or channels in the top layer of silicon in commercial silicon-on-insulator wafers (a thin layer of silicon on a layer of silicon dioxide on a silicon wafer substrate). Silicon Photonics technologies have the advantage of being compatible with the existing manufacturing platforms (e.g., those used for integrated electronic circuits) and can offer highly-integrated optical functions on chip level. However, because of the large difference in refractive index between silicon waveguide cores and silicon dioxide or air cladding layers, there are large differences in optical single mode sizes between the fiber optical mode and optical modes in Si Photonics waveguides. As a result, systems are being developed to ensure efficient coupling between single mode fiber and SOI (silicon-on-insulator) waveguides.

The use of expanded beam approaches to couple light between two optical fibers in a fiber optic connector has successfully been demonstrated as having low loss, insensitivity to position, insensitivity to dust, etc. In this approach, the small mode of the input fiber is expanded to a larger beam using an optical component such as a lens, then the beam is transferred to a similar optical element which focusses the light back into the output fiber. The larger beam is less affected by misalignment or by the presence of dust than the unexpanded mode of the fiber. In principle, it is possible to extend the expanded beam coupling benefits to coupling between a fiber and a waveguide on a PIC, thus facilitating easy and reliable integration of the PIC into large-scale systems.

Figure 1:
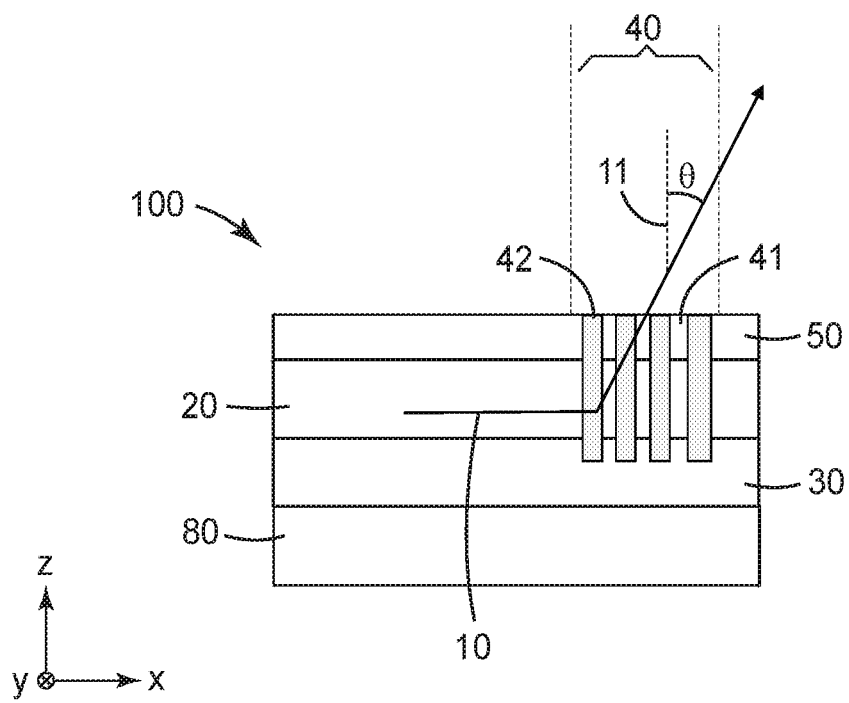
FIGS. 1 and 2 are side and top views of an optical waveguide according to some embodiments.
Figure 2:
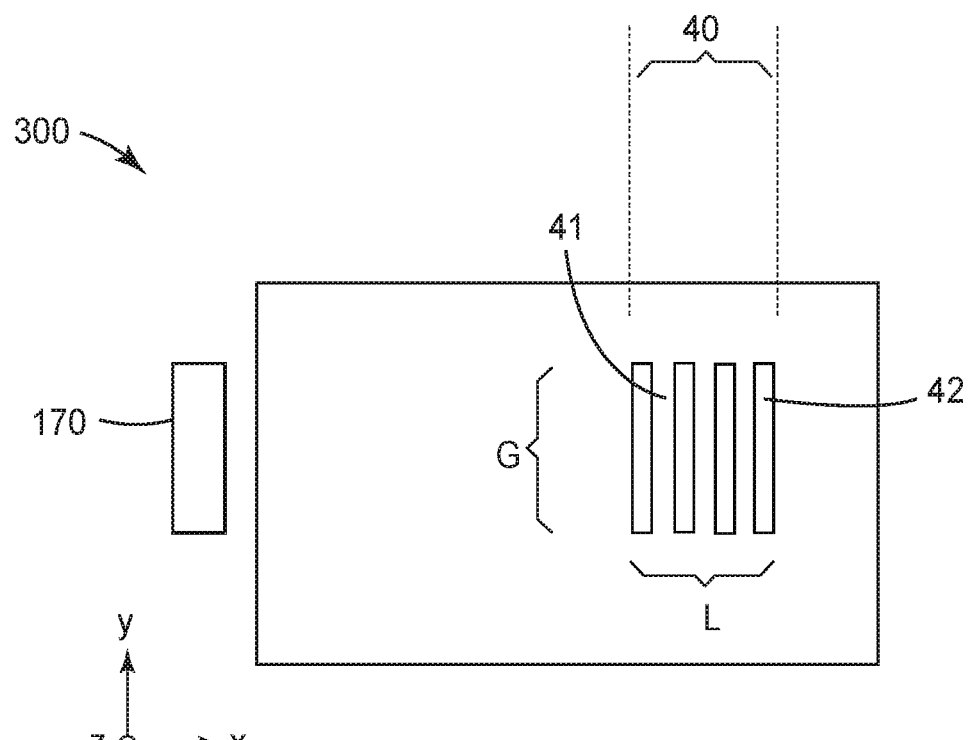

In FIGS. 1 and 2, diagrams illustrate side and top views of an optical waveguide 100 according to an example embodiment. The optical waveguide 100 propagates an optical mode 10 at a first wavelength along a length (x) of the waveguide. The optical waveguide 10 may be part of an optical system 300 that includes a source of light 170 (see FIG. 2). In such a configuration, the optical waveguide of 100 receives light from the source of light 170, which excites only a fundamental optical mode of the optical waveguide 100. The source of light 170 may include a second optical waveguide sequentially arranged with the optical waveguide along the length of the optical waveguide 100.

The waveguide 100 includes an optical core 20 having a substantially polygonal cross-section in a plane (yz-plane) substantially perpendicular to the length of the waveguide 100. The optical core 20 has an index of refraction n1 at the first wavelength. A first optical cladding 30 is disposed adjacent the optical core 20 and has an index of refraction n2 at the first wavelength, where n2<n1.

A spatially modulated index region 40 has alternating higher 41 and lower 42 index regions extending along a width (y) and is arranged along the length of the optical waveguide 100. The index region 40 is configured to extract an optical mode 10 that would otherwise propagate along the length of the waveguide. The spatially modulated index region has a length L along the length of the waveguide 100 greater than about 30 microns. A rate of change of n1 with temperature T is $\Delta n1/\Delta T$ and a rate of change of silicon with temperature T is $\Delta n(Si)/\Delta T$, $\Delta n1/\Delta T<\Delta n(Si)/\Delta T$.

The optical waveguide 100 may include a two-dimensional waveguide so that an optical mode propagating along the length of the waveguide is substantially confined along both the width and a thickness (z) of the optical waveguide 100. At least a portion of the spatially modulated index region 40 may be formed in the first optical cladding 30. At least a portion of the spatially modulated index region 40 may be formed in the optical core 20. The optical waveguide 100 may include a second optical cladding 50 disposed adjacent the optical core 20 and opposite the first optical cladding 30. At least a portion of the spatially modulated index region 40 may be formed in the second optical cladding 50. The second optical cladding 50 may include silicon dioxide.

The optical waveguide 100 may further include an optical substrate 80, the first optical cladding 30 being disposed between the optical core 20 and the optical substrate 80. The substrate 80 may include a silicon substrate. The second optical cladding 50 may be disposed adjacent the optical core 20, such that the optical core 20 is disposed between the second optical cladding 50 and the optical substrate 80.

The spatially modulated index region 40 may extend across substantially the entire width of the optical waveguide 100. In other configurations, at least one region in the alternating higher and lower index regions 41, 42 extends across substantially the entire width of the optical waveguide 100. For example, most regions in the alternating higher and lower index regions 41, 42 extend across substantially the entire width of the optical waveguide 100 In another example, each region in the alternating higher and lower index regions 41, 42 may extend across substantially the entire width of the optical waveguide 100.

Figure 3:
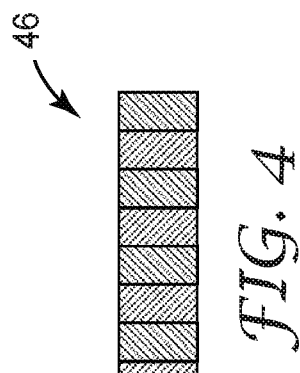
FIGS. 3 and 4 are cross-sectional views of spatially modulated index regions according to various embodiments.

As seen in the cross-sectional view of FIG. 3, the spatially modulated index region 40 may include a corrugated surface 43 having alternating grooves 45 and ridges 44 extending across the width and arranged along the length of the optical waveguide 100. Each groove 45 has a corresponding lower index region of the alternating higher and lower index regions of the spatially modulated index region 40. Each ridge 44 has a corresponding higher index region of the alternating higher and lower index regions of the spatially modulated index region 40.

Figure 4:
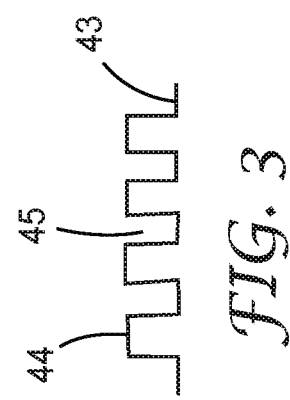

As seen in the cross-sectional view of FIG. 4, the alternating higher and lower index regions of the modulated index region 40 may form a phase grating 46. The different crosshatching indicates regions of different refractive index. The length L of the modulated index region 40 may be greater than 40 microns, e.g., L>50 microns, L>75 microns, L>100 microns, L>125 microns. In some embodiments, L may be less than 150 microns. The alternating higher and lower index regions 41, 42 of the spatially modulated index region form a substantially periodic pattern along the length of the waveguide. The periodic pattern may have a period that ranges from about 0.42 microns to about 2.4 microns.

In one embodiment, the corrugated surface 43 of the spatially modulated index region 40 includes a metal grating with alternating metal and dielectric portions extending across the width and arranged along the length of the optical waveguide. In such a configuration, a real part of an index of refraction of each metal portion defines one of a higher and lower index region in the alternating higher and lower index regions 44, 45 of the spatially modulated index region

40. Each dielectric portion defines the other of a higher and lower index region in the alternating higher and lower index regions 44, 45 of the spatially modulated index region 40. The dielectric portions may include air.

Figure 5:
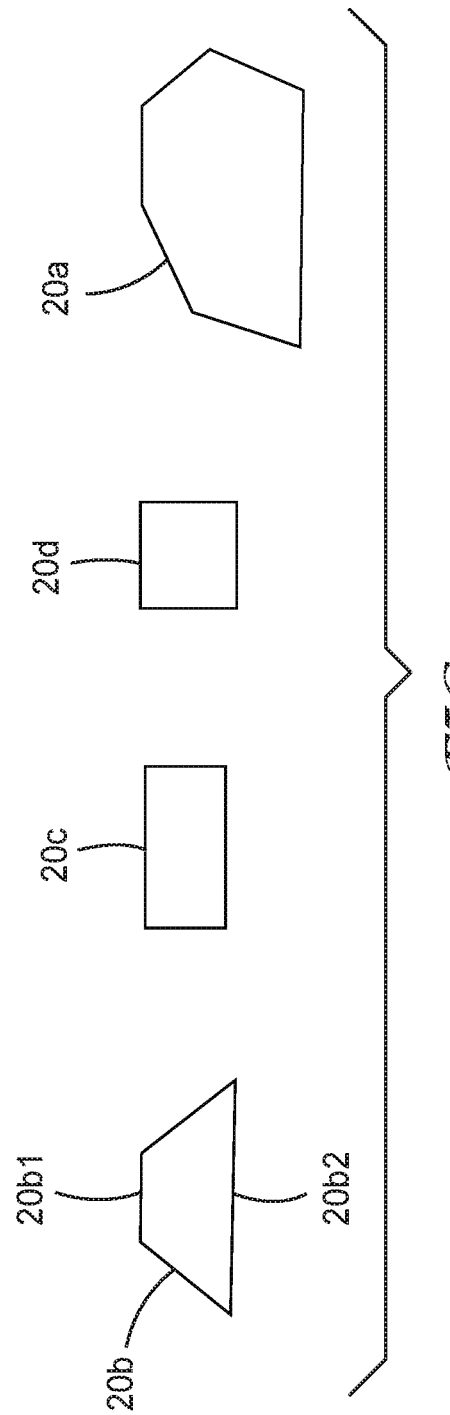
FIG. 5 illustrates cross-sectional views of waveguide core geometry according to various embodiments.

As seen in the cross-sectional views of FIG. 5, the cross-section of the core 20 may be: substantially trapezoidal as in cross section 20*b*; substantially rectangular as seen in cross section 20*c*; substantially square as seen in cross section 20*d*; or have any other polygonal shape as seen in cross section 20*a*. The optical core 20 may have two substantially straight opposing sides, e.g., sides 20*b*1, 20*b*2.

In reference again to FIG. 1, an optical mode 10 extracted by the spatially modulated index region 40 may exit the waveguide 100 making an angle θ with a normal 11 to the waveguide 100, the angle θ being in a range from about 0 degrees to about 45 degrees, or about 0 degrees to about 30 degrees. The optical mode 10 extracted by the spatially modulated index region 40 may exit the waveguide having a beam diameter greater than about 15 microns, or greater than about 30 microns.

The optical core 20 may include silicon nitride. The first optical cladding 30 may include silicon dioxide. The optical core 20 may include one or more of silicon dioxide, silicon oxynitride, titanium oxide, zirconium oxide, hafnium oxide and alloys thereof. The optical core 20 may include amorphous silicon. The optical core may contain a dopant added to increase or decrease the refractive index n1 of the core material, or to decrease the rate of change of the core index with temperature T. The dopant may include phosphorous, titanium or boron. A difference of the core and cladding indices, n1−n2, may be greater than about 0.001, e.g., greater than about 0.01, greater than about 0.1, greater than about 0.2, greater than about 0.3, greater than about 0.6, etc. The first wavelength of the optical mode may be in a range from about 1250 nm to about 1650 nm. The waveguide 100 may be capable of supporting multiple optical modes at the first wavelength.

Figure 6:
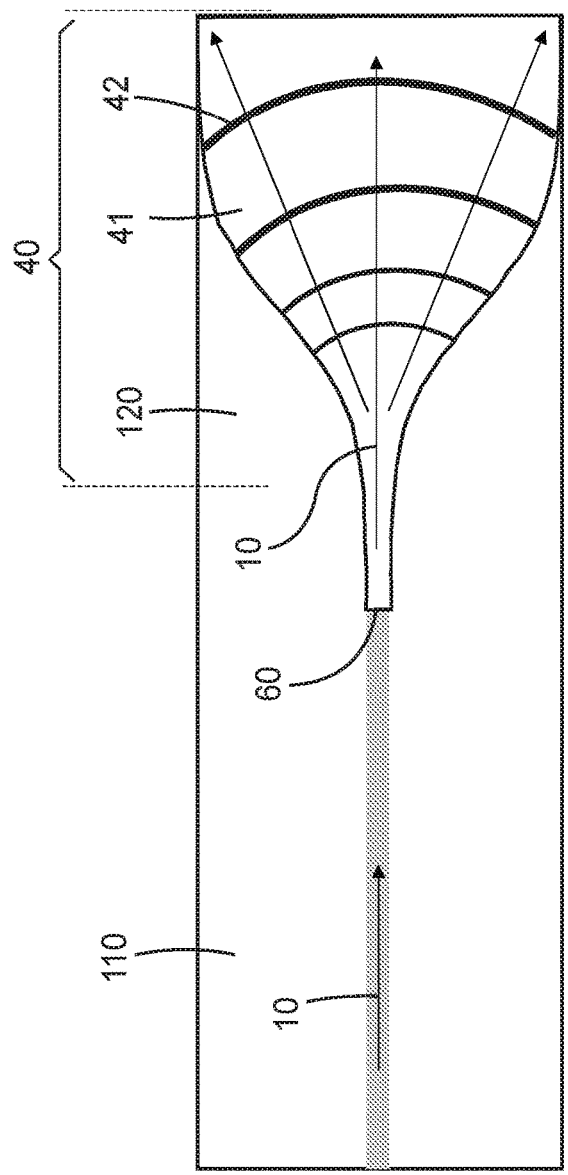
FIGS. 6 and 7 are top and side views of an optical waveguide according to some embodiments.
Figure 7:
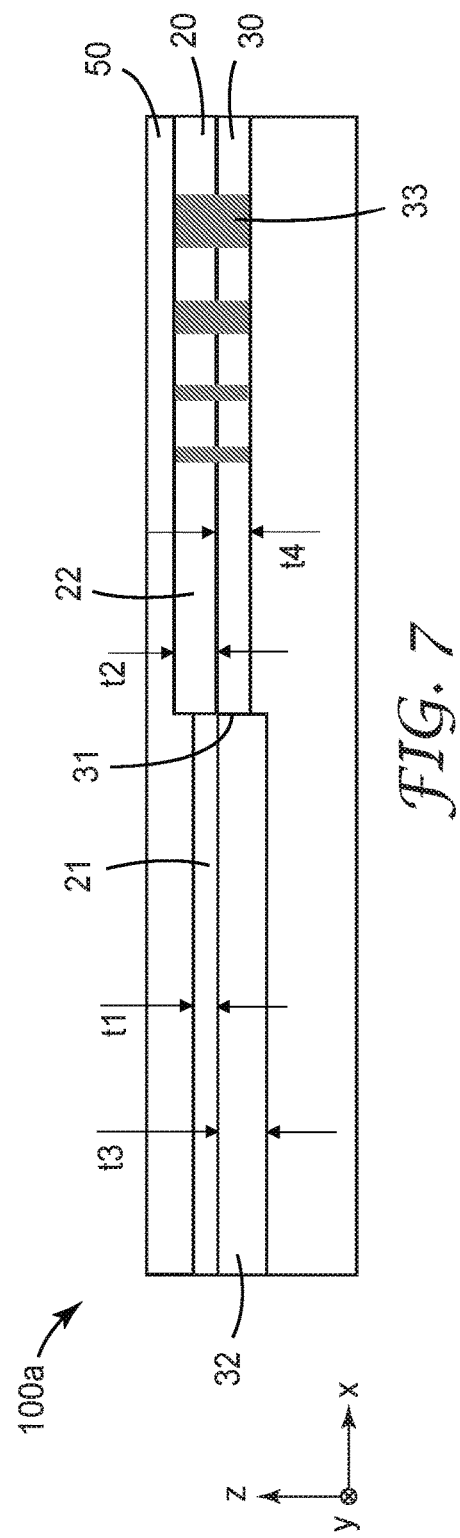

In FIGS. 6 and 7, top and side views show additional details of an optical waveguide 100*a* according to an example embodiment, some features of which may be included in the optical waveguide 100 shown in FIG. 1. In this example, the waveguide includes first and second optical waveguide portions 110, 120 sequentially arranged along the length of the waveguide. The second optical waveguide portion 120 may be capable of supporting multiple optical modes at the first wavelength. In one configuration, the first optical waveguide portion 110 may be single-mode at the first wavelength, and the second optical waveguide portion 120 may be capable of supporting multiple optical modes at the first wavelength. In such a case, an optical single-mode 10 propagating along the first waveguide portion 110 may excites substantially only a fundamental optical mode of the second waveguide portion 120, the excited fundamental optical mode propagating along the second waveguide portion 120.

Figure 12:
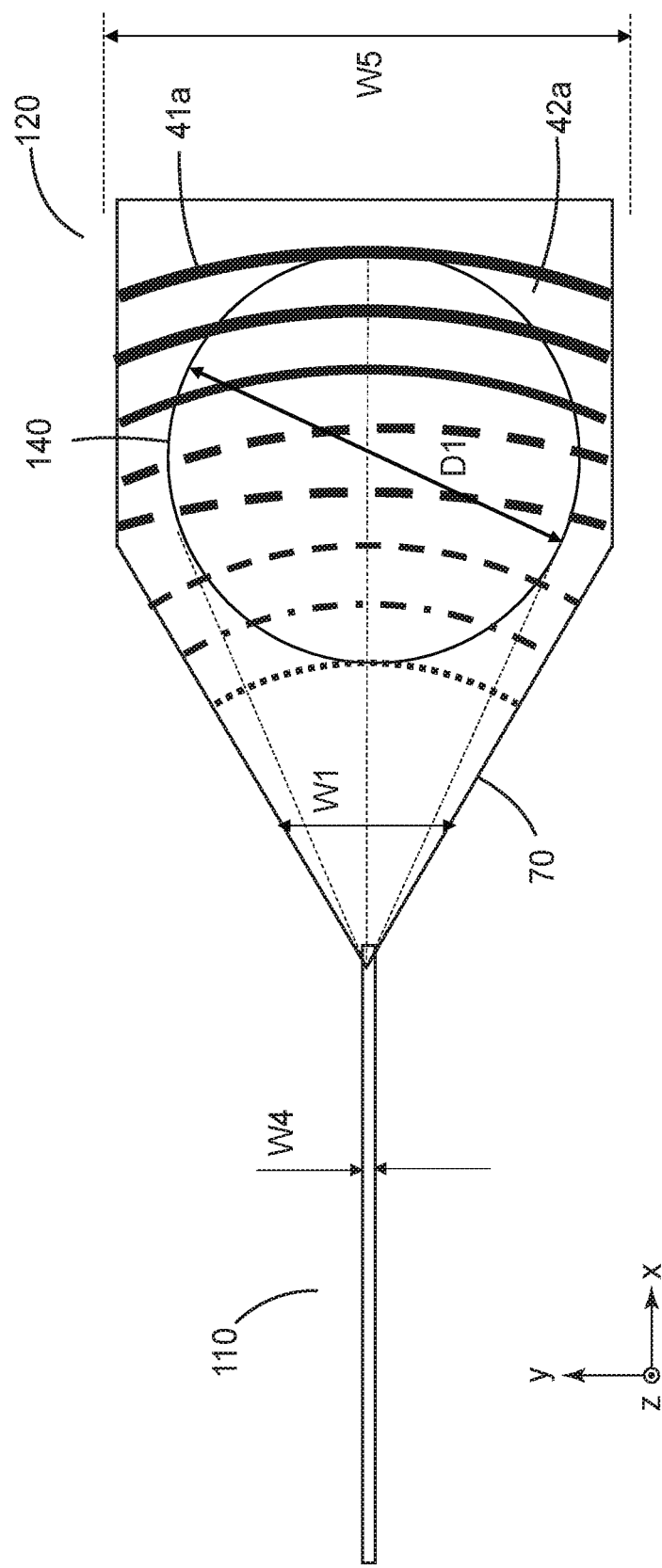
FIGS. 12 and 13 are top views of optical waveguides according to some embodiments.

In a configuration seen in FIG. 12, a transition region 70 connects the first and second optical waveguide portions. The transition region 70 gradually increases in width (W1) in a direction (x) from the first optical waveguide portion 110 to the second optical waveguide portion 120. The shape of this region 70 may be an adiabatic taper. The width W1 of the transition region may be governed by the equation: $W1 = W_0 + 2A \sin^2(\pi x/T)$, wherein $W_0$ is the width of the transition region 70 at the first optical waveguide portion 110, A is a constant, and T is a length of the transition region 70 along the length (x) of the optical waveguide. The constant A may be in a range from about 3 microns to about 75 microns. In other configurations, the width (W1) of the transition region 70 may increase substantially linearly in the direction from the first optical waveguide portion 110 to the second optical waveguide portion 120.

Figure 13:
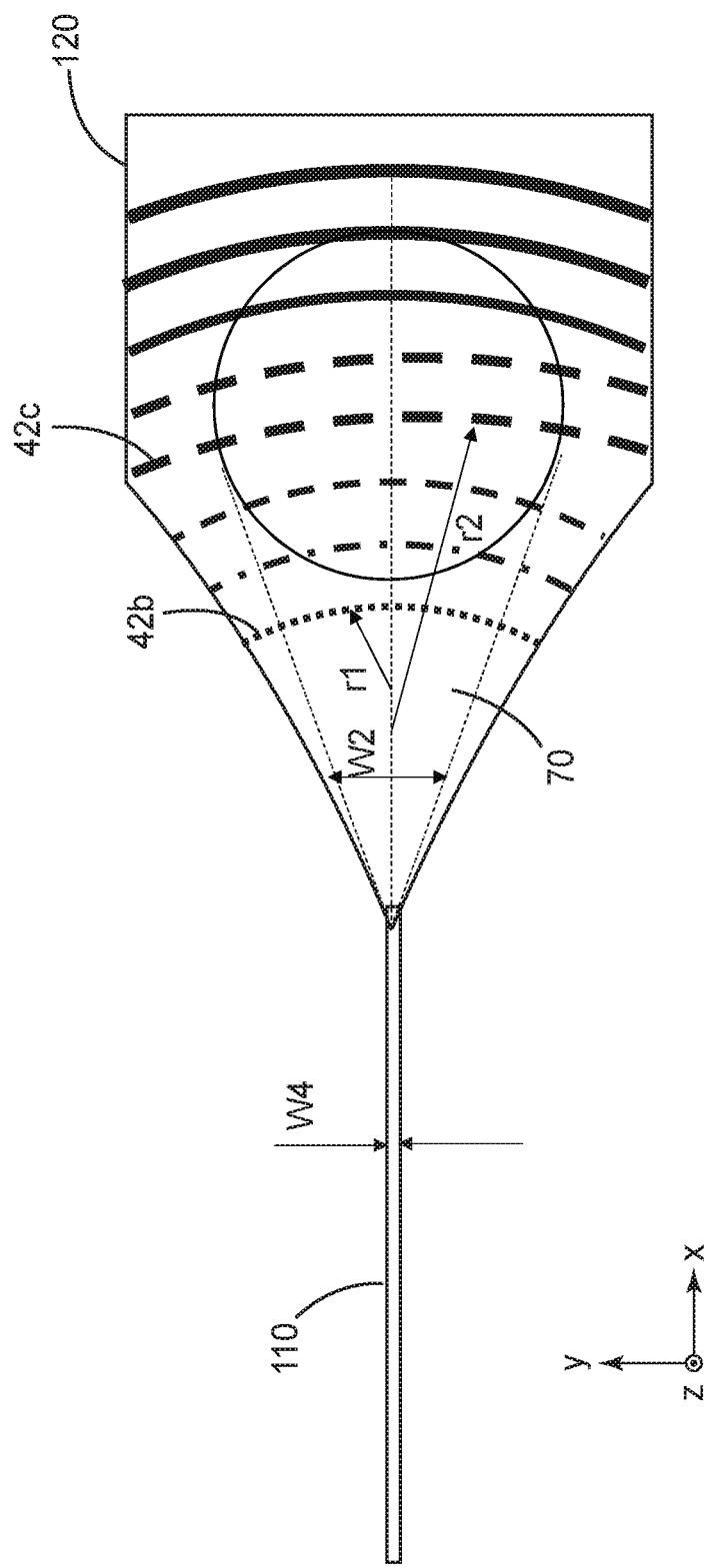
Figure 14:
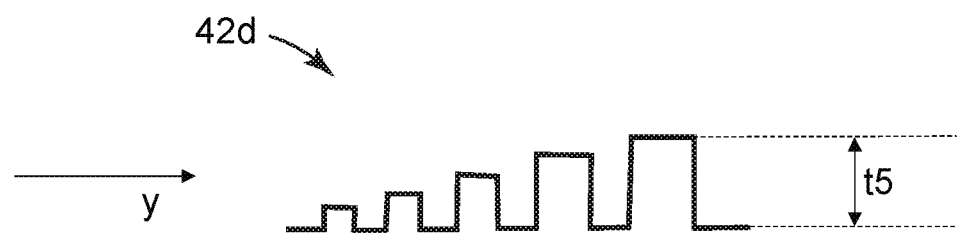
FIGS. 14 and 15 are cross-sectional views of spatially modulated index regions according to various embodiments.

As seen in FIG. 12, each higher and lower index region in the alternating higher and lower index regions may be elongated and curved across the width of the optical waveguide, as indicated by higher and lower index regions 41*a*, 42*a*. The curves of the higher and lower index regions 41*a*, 42*a* can focus or expand light, and can result in a shorter transition region 70 along the x-direction. As seen in FIG. 13, at least two regions 42*b*, 42*c* in the alternating higher and lower index regions have different radii of curvature r1, r2. In this case, the radius of curvature decreases within narrower parts the tapered transition region 70. As seen in FIG. 14, for at least a first region 42*d* in the alternating higher and lower index regions 41, 42, at least one of a thickness t5 and index of the first region 42*d* is spatially modulated across the width of the optical waveguide. The first region 42*b* may be discontinuous across the width of the optical waveguide. For at least one region 42*b*, 42*c*, 42*d* in the alternating higher and lower index regions 41, 42, a characteristic of the at least one region is spatially modulated across the width of the optical waveguide.

Figure 15:
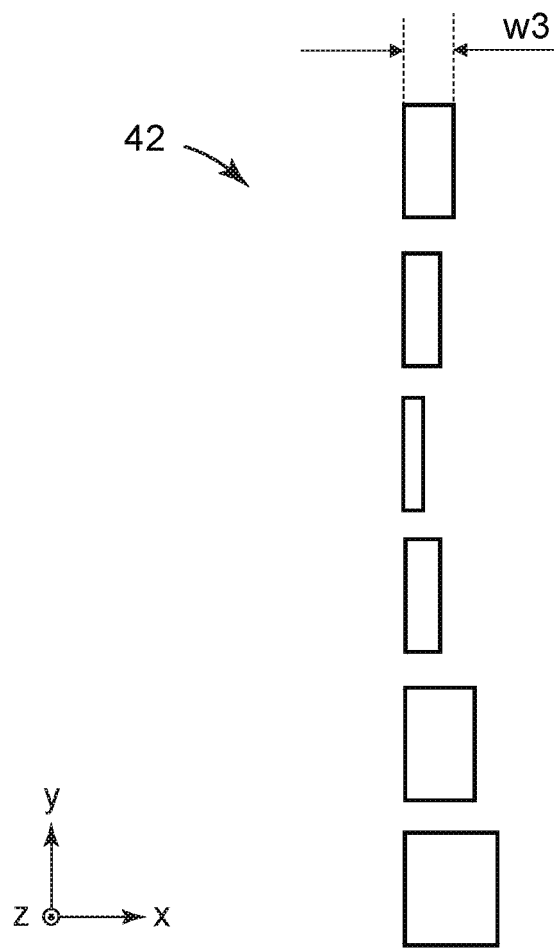

As seen in FIG. 15, the spatially-modulated characteristic may be one or more of a thickness, a width w3, and an index of refraction of the at least one region. At least two regions in the alternating higher and lower index regions 41, 42 may be spatially modulated differently across the width of the optical waveguide.

Figure 10:
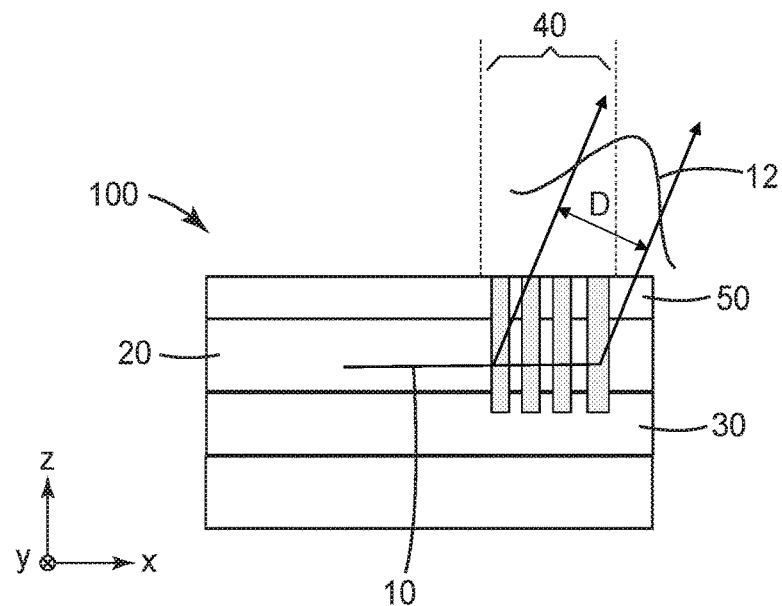
FIG. 10 is a side view of an optical waveguide according to an embodiment.
Figure 16:
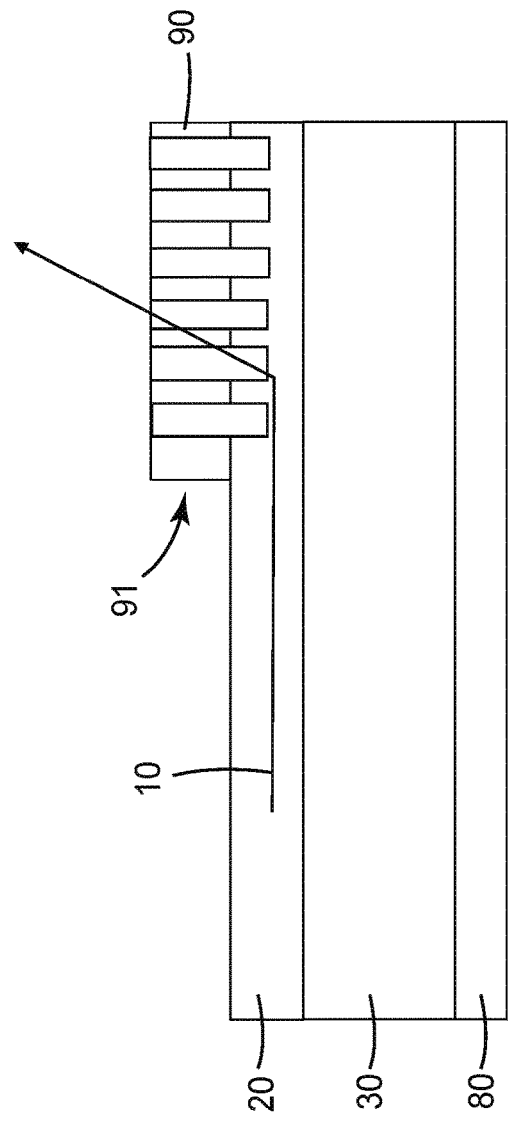
FIGS. 16 and 17 are side views of optical waveguides according to some embodiments.

As seen in FIG. 10, one or more characteristics of at least some regions in the alternating higher and lower index regions are spatially modulated across the width of the optical waveguide, so that an optical mode extracted by the spatially modulated index region exits the waveguide having a substantially gaussian intensity profile 12. As seen in FIG. 16, the spatially modulated index region may include an elevated region 90 that is elevated and defines a step 91 relative to the optical core 20. The elevated region 90 may have the index of refraction n2, or the same index of refraction n1 as the core. At least a portion of the spatially modulated index region in this case is formed in the elevated region 90 and the optical core 20.

Figure 11:
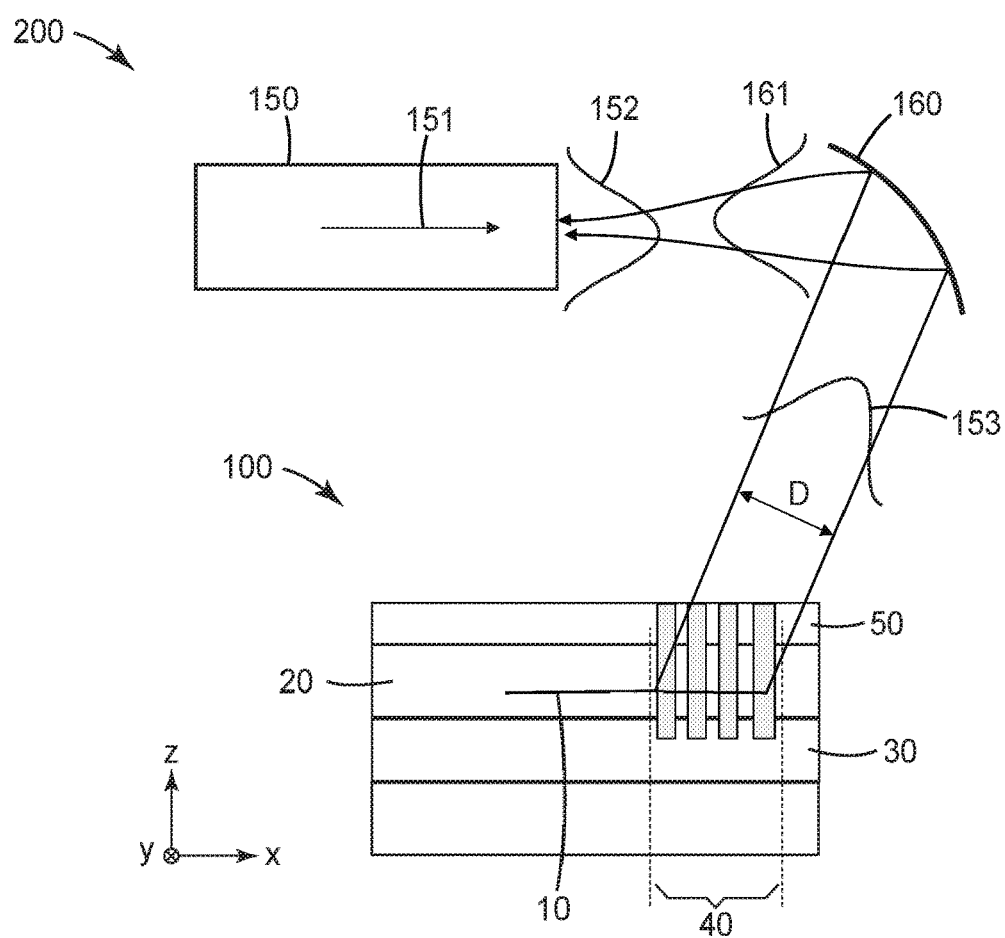
FIG. 11 is a diagram of an optical waveguide system according to some embodiments.

In FIG. 11, a diagram shows an optical system 200 with an optical waveguide 100 as previously described. The system 200 includes an optical fiber 150. Light 151 propagates along the optical fiber 150 at the first wavelength exiting the optical fiber 150 having a first intensity profile 152. The first intensity profile 152 has a first shape, e.g., gaussian. One or more characteristics of at least some regions in the alternating higher and lower index regions of the optical waveguide 100 are spatially modulated across the width of the optical waveguide 100, so that an optical mode extracted by the spatially modulated index region 40 exits the waveguide 100 having a second intensity profile 153 having substantially the first shape of the first intensity profile 152. The optical fiber 150 is positioned to receive the extracted optical mode.

The optical system 200 may further include an optical element 160 for redirecting the extracted optical mode toward the optical fiber 150. The redirected extracted optical mode has a third intensity profile 161 having the first shape. The optical element 160 reduces a divergence of the extracted optical mode. The optical element 160 may be part of a ferrule or other optical connector that mechanically and optically couples the fiber 150 to the waveguide. Such an optical connector may be repeatably attached and removed, e.g., held in place onto the waveguide 100 via snaps, screws, etc., or may be permanently bonded to the PIC.

Figure 17:
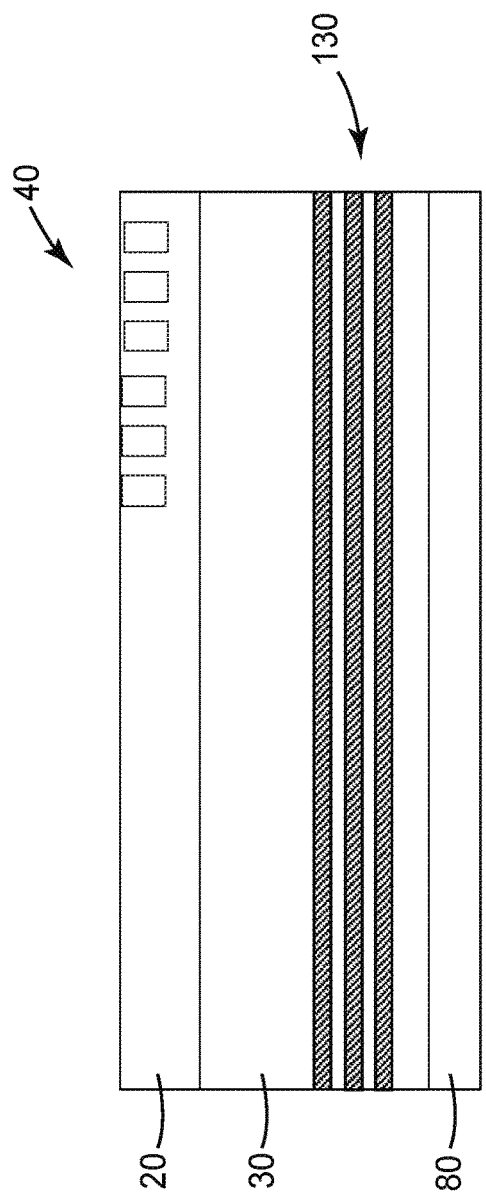

As seen in FIG. 17, the optical waveguide 100 may further include a mirror 130. The first optical cladding 50 disposed between the optical core 20 and the mirror 130. The mirror 130 may include a metallic mirror and/or a distributed Bragg reflecting mirror. The mirror may reflect and coherently couple light extracted by the grating towards the substrate into the beam extracted by the grating away from the substrate, thereby improving the efficiency of light extraction from the waveguide.

In reference again to FIGS. 6 and 7, the optical waveguide 100a propagates an optical mode at a first wavelength along a length (x) of the waveguide 100a. The waveguide 100a includes an optical core 20 with first 21 and second 22 optical core portions sequentially arranged along the length of the waveguide 100a and having different respective first and second indices of refraction n1 and n2 at the first wavelength. An optical mode 10 propagates along the first core portion and couples from the first core portion 21 to the second portion 22 at an interface 60 therebetween.

A first optical cladding 30 is disposed adjacent the optical core 20 and extends along the first and second optical core portions 21, 22. The first optical cladding 30 has an index of refraction at the first wavelength less than n1 and n2. A spatially modulated index region 40 is disposed on or in the second optical core portion 22 of the optical core 20 and has alternating higher 41 and lower 42 index regions extending along a width (y), and arranged along the length of the optical waveguide 100a. The spatially modulated index region 40 is configured to extract the optical mode 10 that would otherwise propagate along the length of the waveguide 100a. A rate of change of n1 with temperature T is $\Delta n1/\Delta T$, and a rate of change of n2 with temperature T is $\Delta n2/\Delta T$, $\Delta n2/\Delta T < \Delta n1/\Delta T$. In one configuration, n1>n2.

In one configuration of the optical waveguide 100a, a thickness t1 of the first optical core portion 21 is different than a thickness t2 of the second optical core portion 22. In other cases, the first and second optical core portions 21, 22 may have substantially a same thickness. The first and second optical core portions 21, 22 may have substantially a same material composition or substantially different material compositions. The spatially modulated index region 41 may have a length L along the length of the waveguide 110a greater than about 30 microns.

The first optical cladding 30 may extend seamlessly along the first and second optical core portions 21, 22. In another embodiment, the first optical cladding 30 may include a seam 31 located proximate the interface between the first and second optical core portions 21, 22. The first optical cladding 30 may include sequentially arranged first 32 and second 33 cladding portions. The first cladding portion 32 is disposed adjacent the first optical core portion 21 and has an index of refraction less than n1. The second cladding portion 33 is disposed adjacent the second optical core portion 22 and has an index of refraction less than n2. A thickness t3 of the first optical cladding portion 32 may be different than a thickness t4 of the second optical cladding portion 33. The first and second optical cladding portions 32, 33 may have substantially a same thickness and/or a same material composition. The first and second optical cladding portions 32, 33 may have substantially different material compositions.

In one configuration of the optical waveguide 100a and as shown in FIG. 13, for at least first 42b and second 42c regions in the alternating higher and lower index regions (with the first region 42b being disposed between the first optical core portion 21 and the second region 42c), the first region 42b is more curved than the second region 42c. In one configuration, at least first 42b and second 42c regions in the alternating higher and lower index regions (with the first region 42b being disposed between the first optical core portion 21 and the second region 42c), a same characteristic of the first and second regions 42b, 42c is spatially modulated at a higher frequency in the first region 42b and at a lower frequency in the second region 42c across the width of the optical waveguide 100a.

The optical waveguide 100a may be a single mode waveguide in regions corresponding to each of the first and second optical core portions 21, 22, so that an optical mode propagating along the length of the waveguide 100a is substantially confined along both the width and a thickness of the optical waveguide 100a while propagating in each of the first and second optical core portions 21, 22. In other configurations, the optical waveguide 100a may be a single mode waveguide at the first wavelength in regions corresponding to the first optical core portion 21, and capable of supporting multiple modes in regions corresponding to the second optical core portion 22, so that an optical single mode propagating along the first optical core portion 21 excites substantially only a fundamental optical mode of the second waveguide portion 22.

Figure 8:
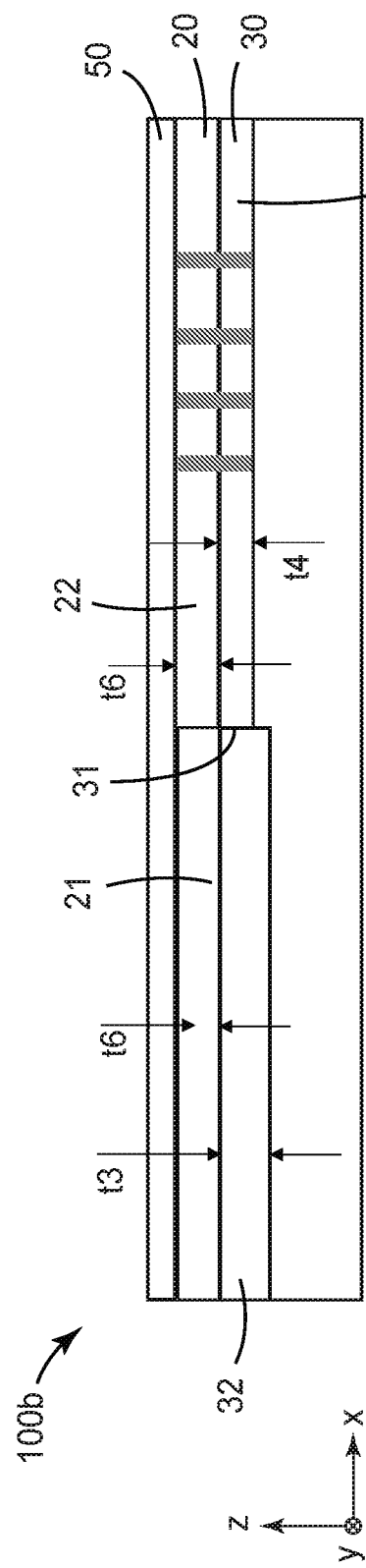
FIGS. 8 and 9 are side and top views of optical waveguides according to some embodiments.

As seen in FIG. 12, the first optical core portion 21 may be narrower (W4) than the second optical core portion 22 (W5). As seen in FIG. 8, the first and second optical core portions may have substantially the same thickness (t6). As seen in FIG. 12, the optical waveguide 100a may further include a transition core region 70 connecting the first and second optical core portions 21, 22 The transition core region 70 gradually increases in width (W1) in a direction from the first optical core portion 21 to the second optical core portion 22. The optical waveguide 100a may be single-mode at the first wavelength in regions corresponding to each of the first and second optical core portions 21, 22. In other configurations, the optical waveguide 100a may be capable of supporting multiple optical modes at the first wavelength in regions corresponding to each of the first and second optical core portions 21, 22.

Figure 9:
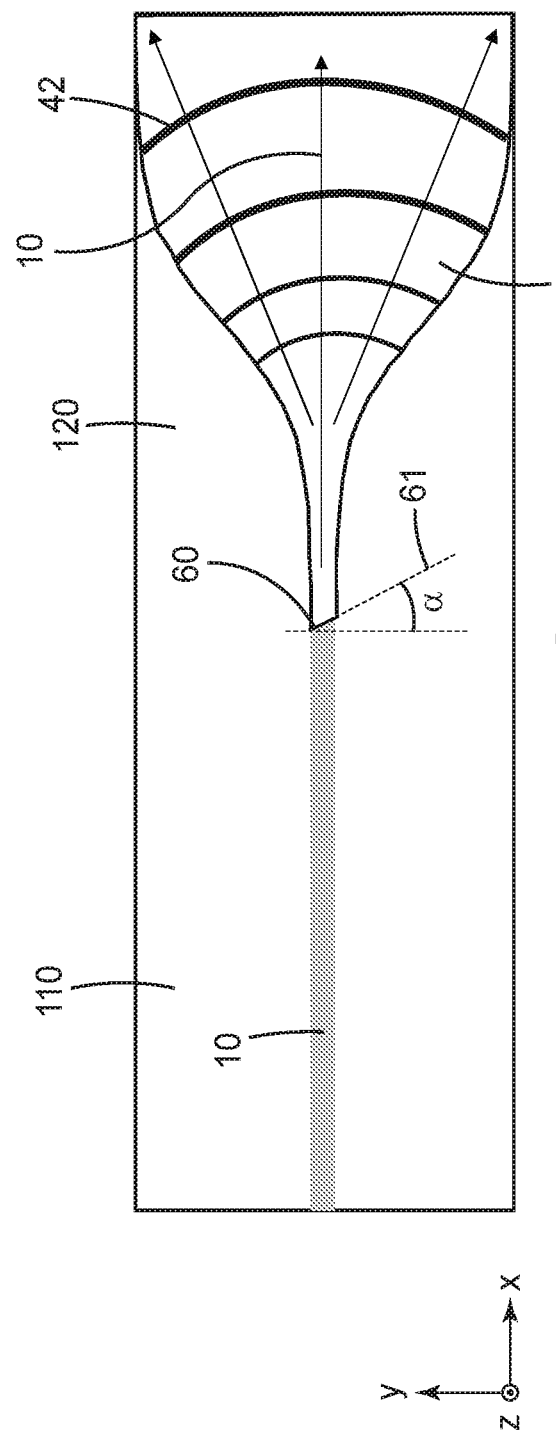

As seen in FIG. 6, the interface 60 between the first and second optical core portions may extend along a direction (y) substantially perpendicular to the length of the waveguide 100a. As seen in FIG. 9, the interface between the first and second optical core portions may extend along a direction 61 making an angle α with the length of the waveguide, where α≥5 degrees.

In reference again to FIGS. 1 and 2, some configurations of the optical waveguide 100 may include a grating 40 configured to extract an optical mode 10 that would otherwise propagate along the optical core along a first direction (x). The grating 40 has a plurality of grating elements 41, 42 forming a substantially periodic pattern. Each grating element 41, 42 extends along a length (G) of the grating element in a direction (y) substantially perpendicular to the first direction. As seen in FIG. 13, a same characteristic of at least two grating elements 42b, 42c are spatially modulated differently along the respective lengths of the at least two grating elements 42b, 42c. As seen in FIG. 12, a diameter (D1) of a largest circle 140 that can be inscribed within the grating is greater than about 30 microns. As seen in FIGS. 14 and 15 the characteristic of grating elements 42b, 42c may be a height (t5), a width (W3), or an index of refraction of the grating element.

The substrate 80 of the optical waveguide may be silicon. The optical core 20 may have an index of refraction n1 at the first wavelength, and a rate of change of n1 with temperature that is less than a rate of change of silicon with temperature. At least one of the at least two grating elements 41, 42 may be spatially nonuniformly modulated along the length of the grating element. The optical waveguide 100 may include a first optical cladding 30 disposed adjacent the optical core 20, between the optical core 20 and the substrate 80. An index of refraction of the first optical cladding 30 at the first wavelength may be less than an index of refraction of the optical core 20 at the first wavelength.

The optical waveguide 100 may include a second optical cladding 50 disposed adjacent the optical core 20, the optical core 20 disposed between the second optical cladding 50 and the substrate 80. The second optical cladding 50 may include silicon dioxide. An optical mode extracted by the grating 40 may exits the waveguide having a largest lateral dimension D greater than about 50 microns (see FIG. 10).

In summary, an optical waveguide with a large area, spatially modulated index region (e.g., grating, alternating index material) can be used to couple light to and from an optical fiber, e.g., an optical fiber coupled to an expanded beam optical element that uses a beam size greater than a mode field diameter of the optical fiber. The relatively large size of the spatially modulated index region, allows room to implement distance-dependent designs. The large size of the spatially modulated index region results in lateral optical misalignment having less of an impact on coupling efficiency. The waveguide may be designed for particular polarizations of light, although structures such as two-dimensional gratings with orthogonal tapers can be used to couple light with orthogonal polarizations. The optical waveguide can be fabricated using established processes used to form semiconductor electronic integrated circuit components.

Embodiments described in this disclosure include:

Item 1. An optical waveguide for propagating an optical mode at a first wavelength along a length of the waveguide, comprising:
- an optical core having a substantially polygonal cross-section in a plane substantially perpendicular to the length of the waveguide, the optical core having an index of refraction n1 at the first wavelength;
- a first optical cladding disposed adjacent the optical core and having an index of refraction n2 at the first wavelength, n2<n1; and
- a spatially modulated index region comprising alternating higher and lower index regions extending along a width, and arranged along the length, of the optical waveguide, and configured to extract an optical mode that would otherwise propagate along the length of the waveguide, the spatially modulated index region having a length L along the length of the waveguide greater than about 30 microns, wherein a rate of change of n1 with temperature T is $\Delta n1/\Delta T$, a rate of change of silicon with temperature T is $\Delta n(Si)/\Delta T$, $\Delta n1/\Delta T < \Delta n(Si)/\Delta T$.

Item 2. The optical waveguide of Item 1, wherein the cross-section is substantially trapezoidal.

Item 3. The optical waveguide of Item 1, wherein the cross-section is substantially rectangular.

Item 4. The optical waveguide of Item 1, wherein the cross-section is substantially square.

Item 4a. The optical waveguide of and of Items 1-4, wherein the optical core comprises two substantially straight opposing sides.

Item 5. The optical waveguide of any of Items 1-4a, wherein the optical core comprises silicon nitride.

Item 6. The optical waveguide of any of Items 1-5, wherein the first optical cladding comprises silicon dioxide.

Item 7. The optical waveguide of Item 6, wherein the optical core comprises silicon dioxide doped with a dopant.

Item 8. The optical waveguide of Item 7, wherein the dopant increases n1.

Item 9. The optical waveguide of any of Items 7-8, wherein the dopant reduces a rate of change of n1 with temperature T.

Item 10. The optical waveguide of Item 7, wherein the dopant is phosphorous or titanium.

Item 11. The optical waveguide of any of Items 1-4a, wherein the optical core comprises one or more of silicon oxynitride, titanium oxide, zirconium oxide, hafnium oxide and alloys thereof.

Item 12. The optical waveguide of any of Items 1-4a, wherein the optical core comprises amorphous silicon.

Item 13. The optical waveguide of any of Items 1-12, wherein n1−n2 is greater than about 0.001.

Item 14. The optical waveguide of any of Items 1-12, wherein n1−n2 is greater than about 0.01.

Item 15. The optical waveguide of any of Items 1-12, wherein n1−n2 is greater than about 0.1.

Item 15. The optical waveguide of any of Items 1-12, wherein n1−n2 is greater than about 0.2.

Item 17. The optical waveguide of any of Items 1-12, wherein n1−n2 is greater than about 0.3.

Item 18. The optical waveguide of any of Items 1-12, wherein n1−n2 is greater than about 0.6.

Item 19. The optical waveguide of any of Items 1-18, wherein the first wavelength is in a range from about 1250 nm to about 1650 nm.

Item 20. The optical waveguide of any of Items 1-19 being capable of supporting multiple optical modes at the first wavelength.

Item 21. An optical system comprising the optical waveguide of Item 20 receiving light from a source of light, the source of light exciting only the fundamental optical mode of the optical waveguide.

Item 22. The optical system of Item 21, wherein the source of light comprises a second optical waveguide sequentially arranged with the optical waveguide along the length of the optical waveguide.

Item 23. The optical waveguide of any of Items 1-22 being a two-dimensional waveguide so that an optical mode propagating along the length of the waveguide is substantially confined along both the width and a thickness of the optical waveguide.

Item 24. The optical waveguide of any of Items 1-23, wherein at least a portion of the spatially modulated index region is formed in the first optical cladding.

Item 25. The optical waveguide of any of Items 1-24, wherein at least a portion of the spatially modulated index region is formed in the optical core.

Item 26. The optical waveguide of any of Items 1-25 further comprising a second optical cladding disposed adjacent the optical core opposite the first optical cladding.

Item 27. The optical waveguide of Item 26, wherein at least a portion of the spatially modulated index region is formed in the second optical cladding.

Item 28. The optical waveguide of any of Items 26-27, wherein the second optical cladding comprises silicon dioxide.

Item 29. The optical waveguide of any of Items 1-28 comprising first and second optical waveguide portions sequentially arranged along the length of the waveguide.

Item 30. The optical waveguide of Item 29, wherein, the second optical waveguide portion is capable of supporting multiple optical modes at the first wavelength.

Item 31. The optical waveguide of Item 29, wherein the first optical waveguide portion is single-mode at the first wavelength, and the second optical waveguide portion is capable of supporting multiple optical modes at the first wavelength.

Item 32. The optical waveguide of Item 31, such that an optical single-mode propagating along the first waveguide portion, excites substantially only a fundamental optical mode of the second waveguide portion, the excited fundamental optical mode propagating along the second waveguide portion.

Item 33. The optical waveguide of any of Items 29-32 further comprising a transition region connecting the first and second optical waveguide portions, the transition region gradually increasing in width in a direction from the first optical waveguide portion to the second optical waveguide portion.

Item 34. The optical waveguide of Item 33, wherein the width of the transition region is governed by the equation: $W1=Wo+2A \sin^2(\pi x/T)$, wherein Wo is the width of the transition region at the first optical waveguide portion, A is a constant, and T is a length of the transition region along the length of the optical waveguide.

Item 35. The optical waveguide of Item 34, wherein A is in a range from about 3 microns to about 75 microns.

Item 36. The optical waveguide of Item 33, wherein the width of the transition regions increases substantially linearly in the direction from the first optical waveguide portion to the second optical waveguide portion.

Item 37. The optical waveguide of any of Items 1-36 being single-mode at the first wavelength.

Item 38. The optical waveguide of any of Items 1-36 being capable of supporting multiple optical modes at the first wavelength.

Item 39. The optical waveguide of any of Items 1-38, wherein L>40 microns.

Item 40. The optical waveguide of any of Items 1-38, wherein L>50 microns.

Item 41. The optical waveguide of any of Items 1-38, wherein L>75 microns.

Item 42. The optical waveguide of any of Items 1-38, wherein L>100 microns.

Item 43. The optical waveguide of any of Items 1-38, wherein L>125 microns.

Item 44. The optical waveguide of any of Items 1-38, wherein L<150 microns.

Item 45. The optical waveguide of any of Items 1-44, wherein the alternating higher and lower index regions of the spatially modulated index region form a substantially periodic pattern along the length of the waveguide.

Item 46. The optical waveguide of Item 45, wherein the periodic pattern has a period in a range from about 0.42 microns to about 2.4 microns.

Item 47. The optical waveguide of any of Items 1-46, wherein the spatially modulated index region comprises a corrugated surface comprising alternating grooves and ridges extending across the width, and arranged along the length, of the optical waveguide, each groove comprising a corresponding lower index region of the alternating higher and lower index regions of the spatially modulated index region, each ridge comprising a corresponding higher index region of the alternating higher and lower index regions of the spatially modulated index region.

Item 48. The optical waveguide of any of Items 1-46, wherein the alternating higher and lower index regions of the modulated index region form a phase grating.

Item 49. The optical waveguide of any of Items 1-48, wherein the spatially modulated index region extends across substantially the entire width of the optical waveguide.

Item 50. The optical waveguide of any of Items 1-49, wherein at least one region in the alternating higher and lower index regions extends across substantially the entire width of the optical waveguide.

Item 51. The optical waveguide of any of Items 1-49, wherein most regions in the alternating higher and lower index regions extend across substantially the entire width of the optical waveguide.

Item 52. The optical waveguide of any of Items 1-49, wherein each region in the alternating higher and lower index regions extends across substantially the entire width of the optical waveguide.

Item 53. The optical waveguide of Item any of Items 1-52, wherein an optical mode extracted by the spatially modulated index region exits the waveguide making an angle with a normal to the waveguide in a range from about 0 degrees to about 45 degrees.

Item 54. The optical waveguide of Item any of Items 1-52, wherein an optical mode extracted by the spatially modulated index region exits the waveguide making an angle with a normal to the waveguide in a range from about 0 degrees to about 30 degrees.

Item 55. The optical waveguide of Item any of Items 1-54, wherein an optical mode extracted by the spatially modulated index region exits the waveguide having a beam diameter greater than about 15 microns.

Item 56. The optical waveguide of any of Items 1-54, wherein an optical mode extracted by the spatially modulated index region exits the waveguide having a beam diameter greater than about 30 microns.

Item 57. The optical waveguide of any of Items 1-54, wherein an optical mode extracted by the spatially modulated index region exits the waveguide having a beam diameter greater than about 50 microns.

Item 58. The optical waveguide of any of Items 1-57 further comprising an optical substrate, the first optical cladding disposed between the optical core and the optical substrate.

Item 59. The optical waveguide of Item 58, wherein the substrate comprises silicon.

Item 60. The optical waveguide of any of Items 1-59 further comprising a second optical cladding disposed adjacent the optical core, the optical core disposed between the second optical cladding and the optical substrate.

Item 61. The optical waveguide of Item 60, wherein the second optical cladding comprises silicon dioxide.

Item 62. The optical waveguide of Item any of Items 1-61, wherein the spatially modulated index region comprises a metal grating comprising alternating metal and dielectric portions extending across the width, and arranged along the length, of the optical waveguide, a real part of an index of refraction of each metal portion defining one of a higher and lower index regions in the alternating higher and lower index regions of the spatially modulated index region, each dielectric portion defining the other of a higher and lower index regions in the alternating higher and lower index regions of the spatially modulated index region.

Item 63. The optical waveguide of Item 62, wherein the dielectric portions comprise air.

Item 64. The optical waveguide of any of Items 1-63, wherein each higher and lower index region in the alternating higher and lower index regions is elongated and straight across the width of the optical waveguide.

Item 65. The optical waveguide of any of Items 1-64, wherein each higher and lower index region in the alternating higher and lower index regions is elongated and curved across the width of the optical waveguide.

Item 66. The optical waveguide of Item 65, wherein at least two regions in the alternating higher and lower index regions have different radii of curvature.

Item 67. The optical waveguide of any of Items 1-66, wherein for at least a first region in the alternating higher and lower index regions, at least one of a thickness and index of the first region is spatially modulated across the width of the optical waveguide.

Item 68. The optical waveguide of any of Items 1-67, wherein for at least a first region in the alternating higher and lower index regions, the first region is discontinuous across the width of the optical waveguide.

Item 69. The optical waveguide of any of Items 1-68, wherein for at least a first region in the alternating higher and lower index regions, a characteristic of the first region is spatially modulated across the width of the optical waveguide.

Item 70. The optical waveguide of Item 69, wherein the characteristic is one or more of a thickness, a width, and an index of refraction of the first region.

Item 71. The optical waveguide of any of Items 1-70, wherein a same characteristic of at least two regions in the alternating higher and lower index regions is spatially modulated differently across the width of the optical waveguide.

Item 72. The optical waveguide of any of Items 1-71, wherein one or more characteristics of at least some regions in the alternating higher and lower index regions are spatially modulated across the width of the optical waveguide, so that an optical mode extracted by the spatially modulated index region exits the waveguide having a substantially gaussian intensity profile.

Item 73. The optical waveguide of any of Items 1-72, wherein the spatially modulated index region comprises an elevated region elevated, and defining a step, relative to the optical core, the elevated region having the index of refraction n2, wherein at least a portion of the spatially modulated index region is formed in the elevated region and the optical core.

Item 74. The optical waveguide of any of Items 1-73 further comprising a mirror, the first optical cladding disposed between the optical core and the mirror.

Item 75. The optical waveguide of Item 74, wherein the mirror is a metallic mirror.

Item 76. The optical waveguide of Item 74, wherein the mirror comprises a distributed Bragg reflecting mirror.

Item 77. An optical system comprising:
the optical waveguide of any of Items 1-76; and
an optical fiber, light propagating along the optical fiber at the first wavelength exiting the optical fiber having a first intensity profile, the first intensity profile having a first shape, wherein one or more characteristics of at least some regions in the alternating higher and lower index regions of the optical waveguide are spatially modulated across the width of the optical waveguide, so that an optical mode extracted by the spatially modulated index region exits the waveguide having a second intensity profile having substantially the first shape, and
wherein the optical fiber is positioned to receive the extracted optical mode.

Item 78. The optical system of Item 77 further comprising an optical element for redirecting the extracted optical mode toward the optical fiber.

Item 79. The optical system of Item 78, wherein the redirected extracted optical mode has a third intensity profile having the first shape.

Item 80. The optical system of any of Items 78-79, wherein the optical element reduces a divergence of the extracted optical mode.

Item 81. The optical system of any of Items 77-80, wherein the first shape is gaussian.

Item 82. An optical waveguide for propagating an optical mode at a first wavelength along a length of the waveguide, comprising:
an optical core comprising first and second optical core portions sequentially arranged along the length of the waveguide and having different respective first and second indices of refraction n1 and n2 at the first wavelength, such that the optical mode propagating along the first core portion, couples from the first core portion to the second portion at an interface therebetween;
a first optical cladding disposed adjacent the optical core and extending along the first and second optical core portions, the first optical cladding having an index of refraction at the first wavelength less than n1 and n2; and
a spatially modulated index region disposed on or in the second optical core portion of the optical core and comprising alternating higher and lower index regions extending along a width, and arranged along the length, of the optical waveguide, and configured to extract the optical mode that would otherwise propagate along the length of the waveguide, wherein a rate of change of n1 with temperature T is $\Delta n1/\Delta T$, a rate of change of n2 with temperature T is $\Delta n2/\Delta T$, $\Delta n2/\Delta T < \Delta n1/\Delta T$.

Item 83. The optical waveguide of Item 82, wherein n1>n2.

Item 84. The optical waveguide of any of Items 82-83, wherein a thickness t1 of the first optical core portion is different than a thickness t2 of the second optical core portion.

Item 85. The optical waveguide of any of Items 82-83, wherein the first and second optical core portions have substantially a same thickness.

Item 86. The optical waveguide of any of Items 82-85, wherein the first and second optical core portions have substantially a same material composition.

Item 87. The optical waveguide of Item any of Items 82-85, wherein the first and second optical core portions have substantially different material compositions.

Item 88. The optical waveguide of any of Items 82-87, wherein the spatially modulated index region has a length L along the length of the waveguide greater than about 30 microns.

Item 89. The optical waveguide of any of Items 82-88, wherein the first optical cladding extends seamlessly along the first and second optical core portions.

Item 90. The optical waveguide of any of Items 82-88, wherein the first optical cladding comprises a seam located proximate the interface between the first and second optical core portions.

Item 91. The optical waveguide of any of Items 82-90, wherein the first optical cladding comprises a sequentially arranged first and second cladding portions, the first cladding portion disposed adjacent the first optical core portion and having an index of refraction less than n1, the second cladding portion disposed adjacent the second optical core portion and having an index of refraction less than n2.

Item 92. The optical waveguide of Item 91, wherein a thickness t3 of the first optical cladding portion is different than a thickness t4 of the second optical cladding portion.

Item 93. The optical waveguide of Item 91, wherein the first and second optical cladding portions have substantially a same thickness.

Item 94. The optical waveguide of any of Items 91-93, wherein the first and second optical cladding portions have substantially a same material composition.

Item 95. The optical waveguide of any of Items 91-93, wherein the first and second optical cladding portions have substantially different material compositions.

Item 96. The optical waveguide of any of Items 82-95, wherein for at least first and second regions in the alternating higher and lower index regions with the first region being disposed between the first optical core portion and the second region, the first region is more curved than the second region.

Item 97. The optical waveguide of any of Items 82-96, wherein for at least first and second regions in the alternating higher and lower index regions with the first region being disposed between the first optical core portion and the second region, a same characteristic of the first and second regions is spatially modulated at a higher frequency in the first region and at a lower frequency in the second region across the width of the optical waveguide.

Item 98. The optical waveguide of any of Items 82-97 being a single mode waveguide in regions corresponding to each of the first and second optical core portions, so that an optical mode propagating along the length of the waveguide is substantially confined along both the width and a thickness of the optical waveguide while propagating in each of the first and second optical core portions.

Item 99. The optical waveguide of any of Items 82-98 being a single mode waveguide at the first wavelength in regions corresponding to the first optical core portion, and capable of supporting multiple modes in regions corresponding to the second optical core portion, so that an optical single mode propagating along the first optical core portion excites substantially only a fundamental optical mode of the second waveguide portion.

Item 100. The optical waveguide of any of Items 98-99, wherein the first optical core portion is narrower than the second optical core portion.

Item 101. The optical waveguide of any of Items 98-100 wherein the first and second optical core portions have substantially the same thickness.

Item 102. The optical waveguide of any of Items 82-101 further comprising a transition core region connecting the first and second optical core portions, the transition core region gradually increasing in width in a direction from the first optical core portion to the second optical core portion.

Item 103. The optical waveguide of any of Items 82-102 being single-mode at the first wavelength in regions corresponding to each of the first and second optical core portions.

Item 104. The optical waveguide of any of Items 82-102 being capable of supporting multiple optical modes at the first wavelength in regions corresponding to each of the first and second optical core portions.

Item 105. The optical waveguide of any of Items 82-104, wherein the interface between the first and second optical core portions extends along a direction substantially perpendicular to the length of the waveguide.

Item 106. The optical waveguide of any of Items 82-104, wherein the interface between the first and second optical core portions extends along a direction making an angle α with the length of the waveguide, α≥5 degrees.

Item 107. An optical waveguide for propagating an optical mode at a first wavelength, comprising:
  an optical core disposed on a substrate; and
  a grating configured to extract an optical mode that would otherwise propagate along the optical core along a first direction, the grating comprising a plurality of grating elements forming a substantially periodic pattern, each grating element extending along a length of the grating element in a direction substantially perpendicular to the first direction, wherein a same characteristic of at least two grating elements are spatially modulated differently along the respective lengths of the at least two grating elements, and wherein a diameter of a largest circle that can be inscribed within the grating is greater than about 30 microns.

Item 108. The optical waveguide of Item 107, wherein the characteristic is a height, a width, or an index of refraction of the grating element.

Item 109. The optical waveguide of any of Items 107-108, wherein the substrate is silicon.

Item 110. The optical waveguide of any of Items 107-109, wherein the optical core has an index of refraction n1 at the first wavelength, and wherein a rate of change of n1 with temperature is less than a rate of change of silicon with temperature.

Item 111. The optical waveguide of any of Items 107-110, wherein at least one of the at least two grating elements is spatially nonuniformly modulated along the length of the grating element.

Item 112. The optical waveguide of any of Items 107-111 further comprising a first optical cladding disposed adjacent the optical core, between the optical core and the substrate, an index of refraction of the first optical cladding at the first wavelength being less than an index of refraction of the optical core at the first wavelength.

Item 113. The optical waveguide of Item 112 further comprising a second optical cladding disposed adjacent the optical core, the optical core disposed between the second optical cladding and the substrate.

Item 114. The optical waveguide of Item 113, wherein the second optical cladding comprises silicon dioxide.

Item 115. The optical waveguide of any of Items 107-114, wherein an optical mode extracted by the grating exits the waveguide having a largest lateral dimension greater than about 50 microns.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Various modifications and alterations of the embodiments discussed above will be apparent to those skilled in the art, and it should be understood that this disclosure is not limited to the illustrative embodiments set forth herein. The reader should assume that features of one disclosed embodiment can also be applied to all other disclosed embodiments unless otherwise indicated. It should also be understood that all U.S. patents, patent applications, patent application publications, and other patent and non-patent documents referred to herein are incorporated by reference, to the extent they do not contradict the foregoing disclosure.

The invention claimed is:

1. An optical waveguide for propagating an optical mode at a first wavelength along a length of the waveguide, comprising:
   an optical core having a substantially polygonal cross-section in a plane substantially perpendicular to the length of the waveguide, the optical core having an index of refraction n1 at the first wavelength;
   a first optical cladding disposed adjacent the optical core and having an index of refraction n2 at the first wavelength, n2<n1;
   a spatially modulated index region comprising alternating higher and lower index regions extending along a width, and arranged along the length, of the optical waveguide, and configured to extract an optical mode that would otherwise propagate along the length of the waveguide, the spatially modulated index region having a length L along the length of the waveguide greater than about 30 microns, wherein a rate of change of n1 with temperature T is $\Delta n1/\Delta T$, a rate of change of silicon with temperature T is $\Delta n(Si)/\Delta T$, $\Delta n1/\Delta T < \Delta n(Si)/\Delta T$;
   first and second optical waveguide portions sequentially arranged along the length of the waveguide, wherein the first optical waveguide portion is single-mode at the first wavelength, and the second optical waveguide portion is capable of supporting multiple optical modes at the first wavelength, such that an optical single-mode propagating along the first waveguide portion, excites substantially only a fundamental optical mode of the second waveguide portion, the excited fundamental optical mode propagating along the second waveguide portion; and
   a transition region connecting the first and second optical waveguide portions, the transition region gradually increasing in width in a direction from the first optical waveguide portion to the second optical waveguide portion, wherein the width of the transition region is governed by the equation: $W1=Wo+2A \sin^2(\pi x/T)$, wherein Wo is the width of the transition region at the first optical waveguide portion, A is a constant, x is the length of the optical waveguide, and T is a length of the transition region along the length of the optical waveguide, and wherein A is in a range from about 3 microns to about 75 microns.

2. The optical waveguide of claim 1 being a two-dimensional waveguide so that an optical mode propagating along the length of the waveguide is substantially confined along both the width and a thickness of the optical waveguide.

3. The optical waveguide of claim 1, wherein the spatially modulated index region comprises a corrugated surface comprising alternating grooves and ridges extending across the width, and arranged along the length, of the optical waveguide, each groove comprising a corresponding lower index region of the alternating higher and lower index regions of the spatially modulated index region, each ridge comprising a corresponding higher index region of the alternating higher and lower index regions of the spatially modulated index region.

4. The optical waveguide of claim 1, wherein the spatially modulated index region comprises a metal grating comprising alternating metal and dielectric portions extending across the width, and arranged along the length, of the optical waveguide, a real part of an index of refraction of each metal portion defining one of a higher and lower index regions in the alternating higher and lower index regions of the spatially modulated index region, each dielectric portion defining the other of a higher and lower index regions in the alternating higher and lower index regions of the spatially modulated index region.

5. The optical waveguide of claim 1, wherein one or more characteristics of at least some regions in the alternating higher and lower index regions are spatially modulated across the width of the optical waveguide, so that an optical mode extracted by the spatially modulated index region exits the waveguide having a substantially gaussian intensity profile.

6. An optical system comprising:
   the optical waveguide of claim 1; and
   an optical fiber, light propagating along the optical fiber at the first wavelength exiting the optical fiber having a first intensity profile, the first intensity profile having a first shape, wherein one or more characteristics of at least some regions in the alternating higher and lower index regions of the optical waveguide are spatially modulated across the width of the optical waveguide, so that an optical mode extracted by the spatially modulated index region exits the waveguide having a second intensity profile having substantially the first shape, and
   wherein the optical fiber is positioned to receive the extracted optical mode.

7. The optical waveguide of claim 1, wherein the optical core comprises silicon nitride.

8. The optical waveguide of claim 1, wherein the first optical cladding comprises silicon dioxide.

9. The optical waveguide of claim 1, wherein the first wavelength is in a range from about 1250 nm to about 1650 nm.

10. The optical waveguide of claim 1, wherein the width of the transition regions increases substantially linearly in the direction from the first optical waveguide portion to the second optical waveguide portion.

* * * * *